United States Patent
Lin et al.

(10) Patent No.: US 9,632,239 B2
(45) Date of Patent: Apr. 25, 2017

(54) LINEAR LIGHT SOURCE, LIGHT GUIDE, AND OPTICAL SCANNING MODULE

(71) Applicants: LITE-ON ELECTRONICS (GUANGZHOU) LIMITED, Guangzhou (CN); LITE-ON TECHNOLOGY CORP., Taipei (TW)

(72) Inventors: Jun-Feng Lin, Taipei (TW); Wei-Chung Cheng, New Taipei (TW)

(73) Assignees: Lite-On Electronics (Guangzhou) Limited, Guangzhou (CN); Lite-On Technology Corp., Taipei (TW)

( * ) Notice: Subject to any disclaimer, the term of this patent is extended or adjusted under 35 U.S.C. 154(b) by 353 days.

(21) Appl. No.: 14/269,275

(22) Filed: May 5, 2014

(65) Prior Publication Data

US 2014/0241002 A1    Aug. 28, 2014

Related U.S. Application Data

(63) Continuation-in-part of application No. 13/240,243, filed on Sep. 22, 2011, now abandoned.

(30) Foreign Application Priority Data

Mar. 10, 2011    (CN) .......................... 2011 1 0062024

(51) Int. Cl.
   F21V 8/00      (2006.01)
   G02B 3/00      (2006.01)
   H04N 1/028     (2006.01)

(52) U.S. Cl.
   CPC ......... G02B 6/0096 (2013.01); G02B 3/0056 (2013.01); G02B 6/001 (2013.01);
   (Continued)

(58) Field of Classification Search
   CPC .......... F21S 8/04; F21S 8/026; F21S 48/1145; F21S 48/1168; F21V 13/04; F21V 7/0016; F21V 5/04; F21V 7/0091; F21V 3/02; F21Y 2101/02; F21Y 2103/00; F21Y 2103/003; G02B 6/0001; G02B 1/045; G02B 6/0033; G02B 6/0045; G02B 6/0073; G02B 2006/12102; G02B 3/0056; G02B 6/001; G02B 6/0006; G02B 6/0038; G02B 6/0055; G02B 6/0096; F24J 2002/1014; F24J 2/541; G02F 1/133615; H01L 33/58; Y02B 20/72; F21K 9/17; F21K 9/50; F21L 4/02;
   (Continued)

(56) References Cited

U.S. PATENT DOCUMENTS

2009/0185379 A1* 7/2009 Chen ..................... F21V 15/013
                                                                362/294

* cited by examiner

*Primary Examiner* — Stephen F Husar
(74) *Attorney, Agent, or Firm* — Rosenberg, Klein & Lee

(57) ABSTRACT

A linear light source emits light beams for illuminating a target. The linear light source includes a light guide, and a light-emitting unit. The light guide has a bottom surface, first and second reflecting surfaces extending from opposite side edges of the bottom surface, and a light converging convex surface extending between the first and second reflecting surfaces, curved outward, and having multiple radii of curvature. The light-emitting unit emits light beams that exit through the light converging convex surface to converge at multiple points distributed at distinct positions in a direction perpendicular to a surface of the target, such that the target to be disposed within a range defined by the multiple points is evenly illuminated.

20 Claims, 7 Drawing Sheets

(52) U.S. Cl.
CPC ..... *H04N 1/02835* (2013.01); *H04N 1/02895* (2013.01); *G02B 6/0006* (2013.01); *G02B 6/0038* (2013.01); *G02B 6/0055* (2013.01)

(58) Field of Classification Search
CPC .... F21L 4/027; H05B 33/0803; Y10S 362/80; H04N 1/02835; H04N 1/02895
See application file for complete search history.

LINEAR LIGHT SOURCE, LIGHT GUIDE, AND OPTICAL SCANNING MODULE

CROSS-REFERENCE TO RELATED APPLICATION

This application is a continuation-in-part of U.S. patent application Ser. No. 13/240,243, filed on Sep. 22, 2011, currently pending, and claiming priority of Chinese Application No. 201110062024.6, filed on Mar. 10, 2011.

BACKGROUND OF THE INVENTION

1. Field of the Invention

The present invention relates to a light source, more particularly to a linear light source suitable for an optical scanning module.

2. Description of the Related Art

An optical scanning module is applied to a scanner, a fax machine, or a multi-function printer (MFP) which incorporates functionality of a photocopier, a scanner, a printer and a fax machine. The optical scanning module usually includes a light source, a reflecting mirror, a focusing lens, and an image sensor.

The light source is capable of emitting light beams for illuminating a scan target. The scan target has a target pattern. The image sensor receives reflected light beams and generates electronic signals corresponding to the target pattern. The aforementioned light source generally adopts a cold cathode fluorescent lamp (CCFL) for emitting white light, and illuminates the scan target via an elongated slit. The reflected light beams from the scan target are reflected once again by the reflecting mirror and are focused by the focusing lens so as to be imaged on the image sensor. However, since the CCFL requires an inverter for providing high-voltage and high-frequency alternating current to operate, an issue of high power consumption is presented. Moreover, mercury vapor filled in a lamp tube of the CCFL may pollute the environment, such that use of the CCFL is regulated in many countries.

Therefore, in recent years, optical scanning modules adopting a linear light source which is formed by a light emitting diode (LED) in cooperation with a light guide as the light source have been proposed. Referring to FIG. 1, the conventional linear light source 9 includes a light guide 91, a LED package 92 disposed at one end of the light guide 91, and a reflecting shield 93 covering side walls of the light guide 91. A transverse section of the light guide 91 is rectangular or polygonal in shape. The light guide 91 has a light-exit surface 911, and is provided with a plurality of optical structures 912 disposed on a surface of the light guide 91 opposite to the light-exit surface 911. In this design, since light beams exiting the light-exit surface 911 are divergent light beams, aside from the light beams illuminating the scan target, the other light beams are wasted.

Moreover, a light guide of a linear light source of an optical scanning module nowadays have a common issue, that is, light beams emitted from the linear light source are merely concentrated at a specific distance away from the light guide. For example, a conventional linear light source including a light guide which has a hexagonal cross section is designed to concentrate light beams emitted therefrom at a position about 0.4 mm above a transparent plate. Once a target to be scanned substantially deviates from the position at which the light beams are concentrated, illumination of the target is significantly reduced. Therefore, in a condition that paper to be scanned has uneven surfaces or wrinkles, the conventional linear light source may not evenly illuminate the paper, resulting in inferior scanning quality.

It is apparent from the foregoing that light beams emitted from the linear light source of the conventional optical scanning module are merely concentrated at a specific position. Accordingly, this invention attempts to solve this issue so as to promote scanning quality.

SUMMARY OF THE INVENTION

Therefore, an object of the present invention is to provide a linear light source capable of emitting converging light beams within a predetermined range, and a light guide of the linear light source.

Accordingly, the linear light source of the present invention is configured to emit light beams for illuminating a surface of a target. The linear light source comprises a light guide, a light-emitting unit and a reflecting layer. The light guide has a bottom surface, first and second reflecting surfaces extending from opposite side edges of the bottom surface, respectively, and a light converging convex surface extending between the first and second reflecting surfaces and curved outward with respect to the bottom surface. The first and second reflecting surfaces define symmetrical segments of an imaginary parabolic curved surface having a parabolic transverse section opening toward the light converging convex surface. The light-emitting unit is configured to emit light beams that propagate along the light guide and that exit through the light converging convex surface. The reflecting layer is disposed on the first and second reflecting surfaces. The light converging convex surface is a convex surface with multiple radii of curvature. A portion of the light beams is reflected by the first and second reflecting surfaces so as to form parallel light beams. Another portion of the light beams forms direct light beams. The light converging convex surface converges, along an optical axis of the light guide, the parallel light beams and the direct light beams at multiple points which are distributed at distinct positions in a direction perpendicular to the surface of the target, such that the target to be disposed within a range defined by the multiple points is evenly illuminated.

The linear light source of the present invention is suitable for application to an optical scanning module and may be used for illumination. Therefore, the aforementioned target may be a scan target of an optical scanning module or any object to be illuminated by the linear light source.

Another object of the present invention is to provide an optical scanning module comprising the aforementioned linear light source for illuminating a scan target.

An effect of the present invention resides in that the light guide of the linear light source uses a parabolic design of the first and second reflecting surfaces in cooperation with the light converging convex surface so as to illuminate convergently a specific region. The light converging convex surface converges, along an optical axis of the light guide, the parallel light beams and the direct light beams at multiple points which are distributed at distinct positions in a direction perpendicular to the surface of the target, such that the target to be disposed within a range defined by the multiple points is evenly illuminated. Specifically and preferably, the target is evenly illuminated along an axis perpendicular to the surface of the target and along a direction transverse to the axis. When the linear light source is applied in the optical scanning module, even if paper to be scanned has wrinkles or is relatively thick, or even if there is assembly tolerance existing in the optical scanning module, illumination effect of the light beams is not adversely influenced, and scanning quality may be maintained.

BRIEF DESCRIPTION OF THE DRAWINGS

Other features and advantages of the present invention will become apparent in the following detailed description of the two preferred embodiments with reference to the accompanying drawings, of which.

DETAILED DESCRIPTION OF THE PREFERRED EMBODIMENTS

Figure 1:
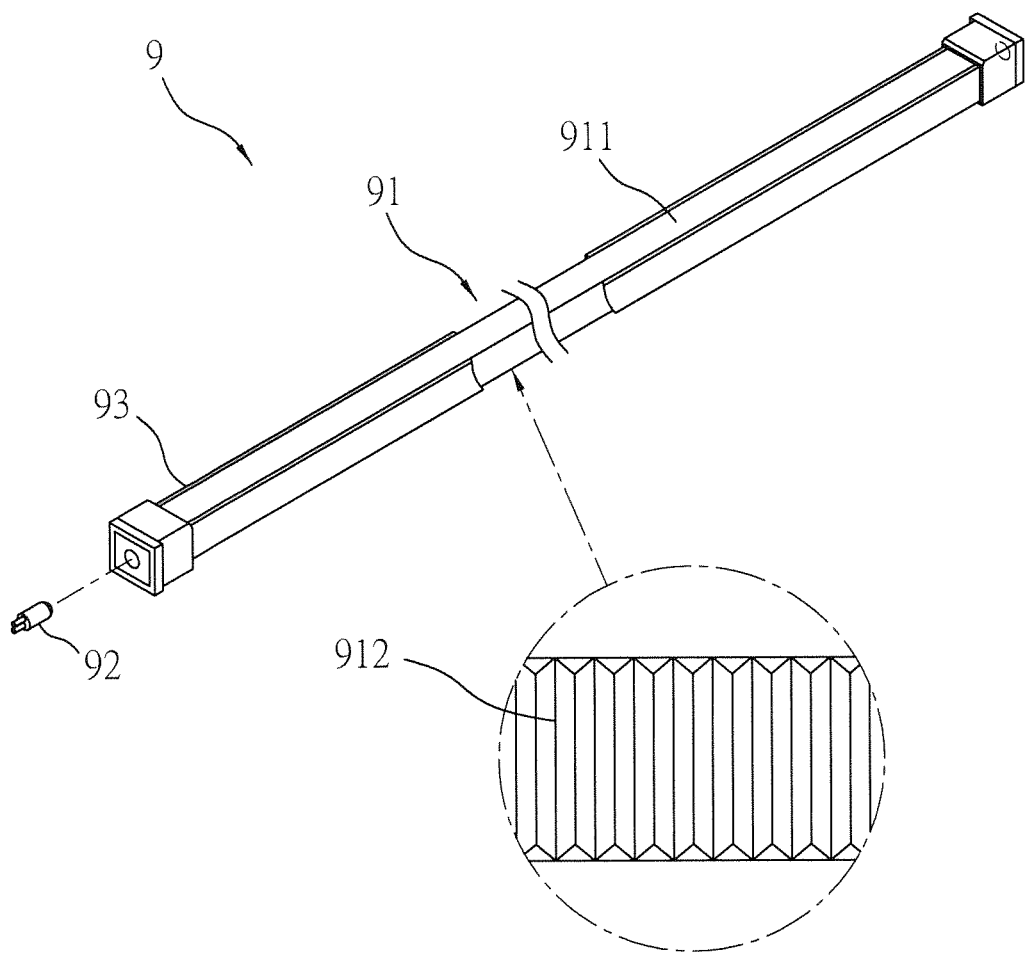
FIG. 1 is a perspective view illustrating a linear light source of a conventional optical scanning module.

Before the present invention is described in greater detail with reference to the two preferred embodiments, it should be noted that the same reference numerals are used to denote the same elements throughout the following description.

Figure 2:
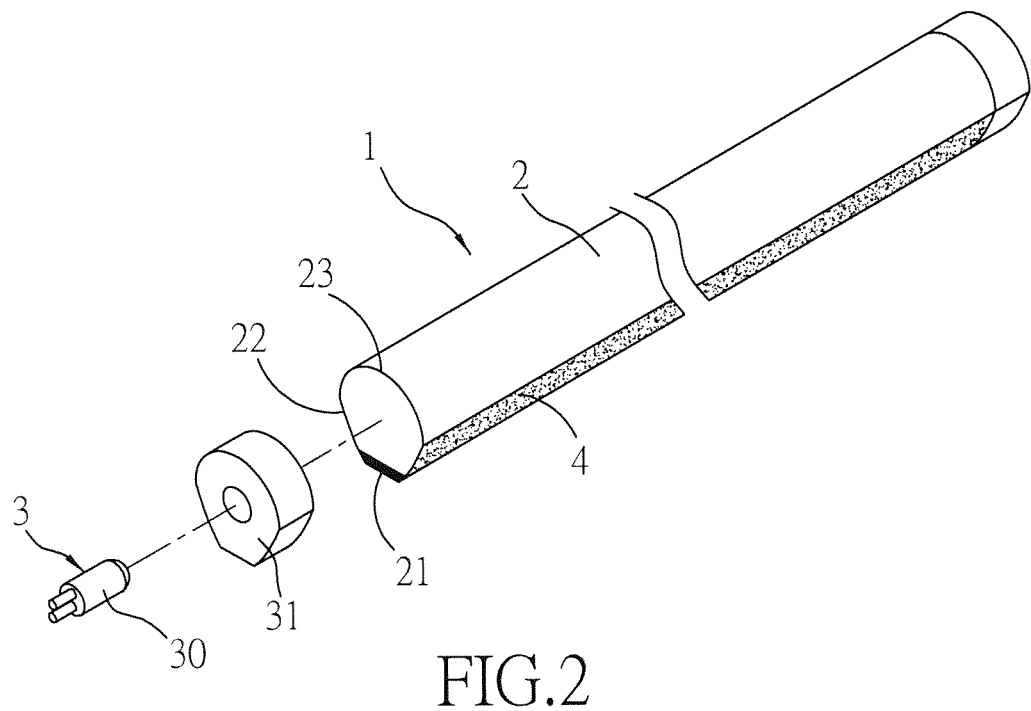
FIG. 2 is a partly exploded perspective view illustrating a first preferred embodiment of a linear light source of an optical scanning module according to the present invention.
Figure 3:
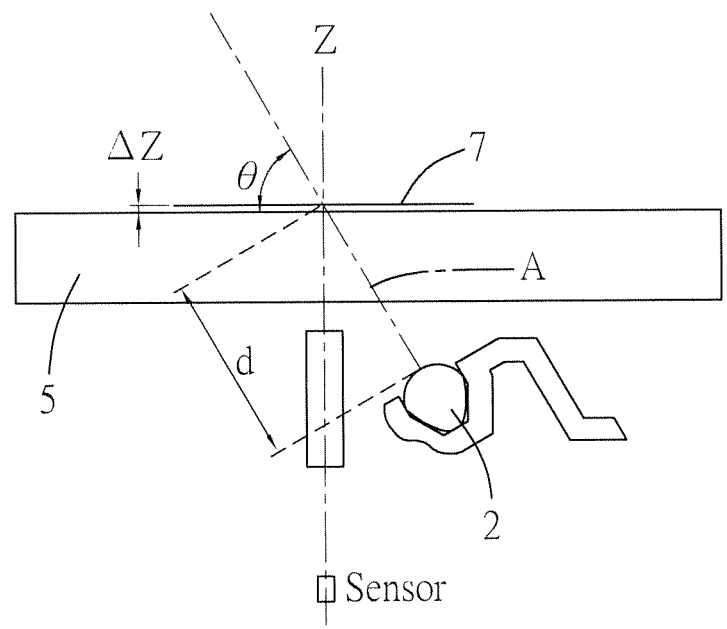
FIG. 3 is a schematic diagram illustrating the arrangement of the linear light source of the first preferred embodiment and a transparent plate.
Figure 4:
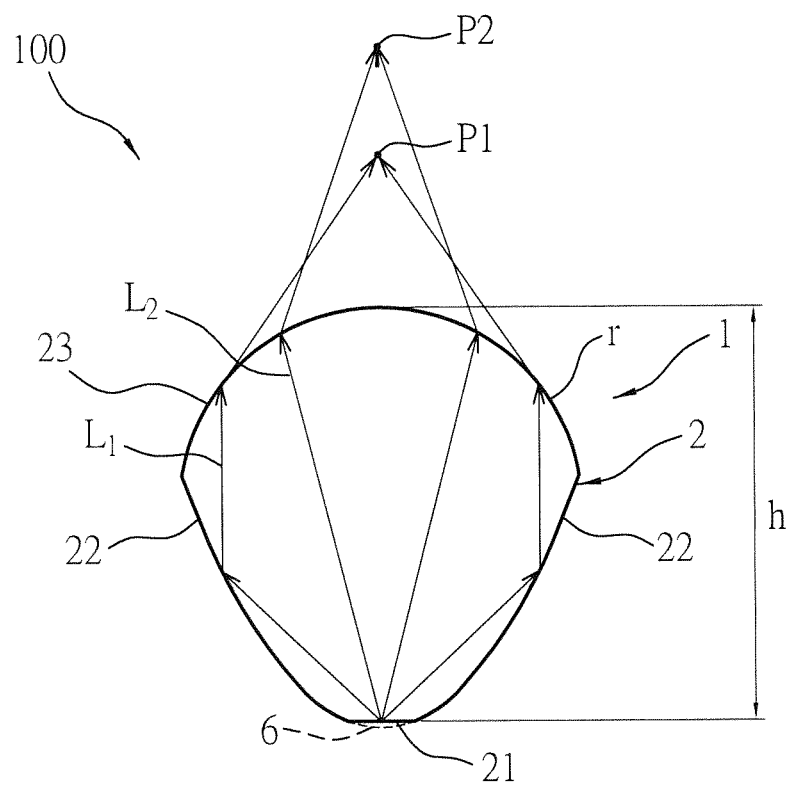
FIG. 4 is a schematic view illustrating light beams propagating and being refracted in a cross section of a light guide according to the first preferred embodiment.

Referring to FIG. 2, FIG. 3 and FIG. 4, the first preferred embodiment of a linear light source 1 according to the present invention is to be applied in an optical scanning module 100. The optical scanning module 100 includes a transparent plate 5 for placement of a scan target 7 which is to be scanned. The linear light source 1 is capable of emitting light beams for illuminating the scan target 7 placed above the transparent plate 5, such as paper in general. The optical scanning module 100 further includes a sensor disposed under the transparent plate 5. Since the feature of the present invention does not reside in the detailed configuration of electronic components of the optical scanning module 100, which is known in the art, further details of the same are omitted herein for the sake of brevity.

The linear light source 1 comprises a light guide 2, a light-emitting unit 3, and a reflecting layer 4.

The light guide 2 is elongate in shape and is to be disposed parallel to and below the transparent plate 5. The light guide 2 has a bottom surface 21, first and second reflecting surfaces 22 extending from opposite side edges of the bottom surface 21, respectively, and a light converging convex surface 23 connected to the first and second reflecting surfaces 22 and curved outward with respect to the bottom surface 21. The light converging convex surface 23 is to be spaced apart from a lower surface of the scan target 7 by a distance (d). A profile of the light guide 2 has an optical axis A. The optical axis A and the transparent plate 5 cooperate to form an angle θ.

In this embodiment, the light-emitting unit 3 includes a light-emitting diode (LED) package 30 which is disposed at one end of the light guide 2 via a mount 31. However, the present invention is not limited to the disclosure herein. The light-emitting unit 3 may include a plurality of LED packages 30 disposed at two ends of the light guide 2, respectively. The reflecting layer 4 is disposed on the first and second reflecting surfaces 22 of the light guide 2. The reflecting layer 4 may be disposed in a covering manner, or by means of combining reflective materials with the first and second reflecting surfaces 22 via spraying, printing, or coating techniques.

Figure 5:
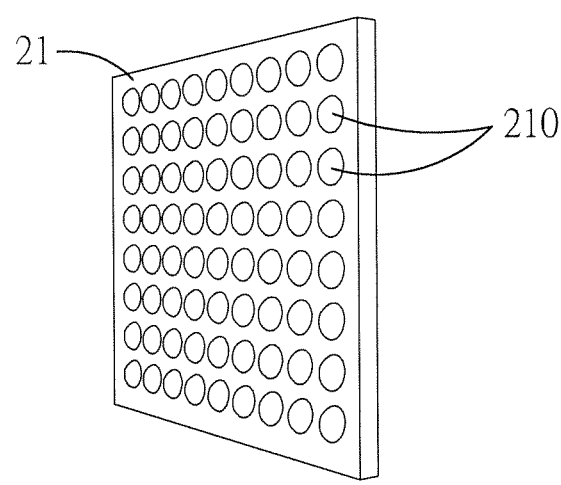
FIG. 5 is a perspective view illustrating optical structures disposed in a bottom surface of the light guide.

Referring to FIG. 4 and FIG. 5, the first and second reflecting surfaces 22 define symmetrical segments of an imaginary parabolic curved surface 6. The imaginary parabolic curved surface 6 has a parabolic transverse section opening toward the light converging convex surface 23. The parabolic transverse section has a focal point located at the bottom surface 21. The bottom surface 21 is provided with a plurality of optical structures 210. The optical structures 210 enable light beams emitted from the light-emitting unit 3 to propagate along the light guide 2 more evenly. Each of the optical structures 210 has a form which is selected from a V-cut, a V-projection, a convex dot and a concave recess. Arrangement of the optical structures 210 may be selected from matrix arrangement, staggered arrangement and irregular arrangement. In this embodiment, the V-cut or V-projection is taken as an example of the form of each of the optical structures 210. Adjacent ones of the optical structures 210 are spaced apart by a distance (p). Each of the optical structures 210 has a depth or a height ranging from 0.05 p to 0.6 p.

By virtue of a parabolic design of the first and second reflecting surfaces 22, light beams directed from the focal point of the parabolic transverse section of the imaginary parabolic surface 6 may include a portion to be reflected by the segments of the imaginary parabolic curved surface 6 (i.e., the first and second reflecting surfaces 22) so as to form parallel light beams $L_1$. The parallel light beams $L_1$ are refracted by the light converging convex surface 23 and are focused at a position $P_1$, i.e., a position of a focal point of the light converging convex surface 23. In this embodiment, the light converging convex surface 23 is a convex surface with a uniform radius of curvature. The position $P_1$ is spaced apart from the light converging convex surface 23 by a distance $$\frac{nr}{\Delta n},$$

in which n represents refractive index of an environment medium, $\Delta n$ represents a difference value between n and n', more particularly $\Delta n = n - n'$, n' represents refractive index of a material of the light guide 2, and r represents the radius of curvature of the light converging convex surface 23. On the other hand, the light beams directed from the focal point of the parabolic transverse section of the imaginary parabolic surface 6 may further include a portion of direct light beams $L_2$. The direct light beams $L_2$ are refracted directly by the light converging convex surface 23 and are focused at a position $P_2$, i.e., a position of an image point of the light converging convex surface 23. The position $P_2$ is spaced apart from the light converging convex surface 23 by a distance $$\frac{nhr}{h\Delta n - n'r},$$

in which h represents a height of the light guide 2.

By means of the aforementioned design, the light beams emitted from the linear light source 1 of the first preferred embodiment may be evenly focused at the position $P_1$ and the position $P_2$ above the light converging convex surface 23. Therefore, in practice, the linear light source 1 is to be disposed below the transparent plate 5 such that a distance (d) between the light converging convex surface 23 and a predetermined position of the scan target 7 (see FIG. 3) ranges from the value $$\frac{nr}{\Delta n}$$

to the value $$\frac{nhr}{h\Delta n - n'r}.$$

The distance (d) is preferably equal to $$\frac{nhr}{2}\left(\frac{1}{h\Delta n - n'r} + \frac{1}{h\Delta n}\right).$$

Specifically, since the values of n, n', r and h may be determined in advance, the value of $$\frac{nhr}{2}\left(\frac{1}{h\Delta n - n'r} + \frac{1}{h\Delta n}\right)$$

may also be determined. Moreover, a thickness of the transparent plate 5, and an included angle θ formed by the optical axis A and the transparent plate 5 may also be determined in advance. Therefore, a distance between an apex of the light guide 2 and a bottom surface of the transparent plate 5 may be designed so that the scan target 7 is located between the position of the focal point $P_1$ and the position of the image point $P_2$, and more preferably located at a center point of a region defined by the positions $P_1$ and $P_2$.

In this way, the focal point and the image point cooperate to define the region, and the scan target 7 located within the region may be evenly and concentratedly illuminated. Therefore, even if paper to be scanned has wrinkles (i.e., uneven) or is relatively thick, or even if there is assembly tolerance existing in the optical scanning module 100, illumination effect of the light beams is not adversely influenced, and scanning quality may be maintained.

Figure 6:
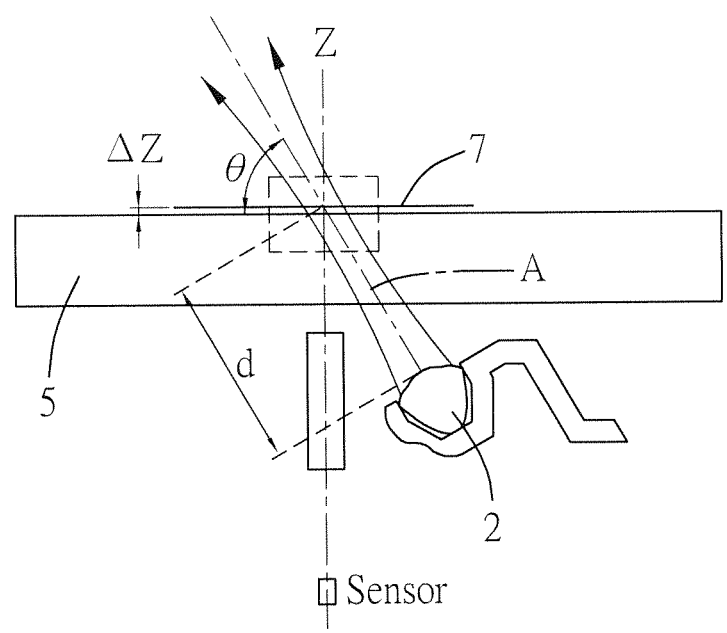
FIG. 6 is a schematic diagram illustrating the arrangement of a linear light source of a second preferred embodiment and the transparent plate.
Figure 7:
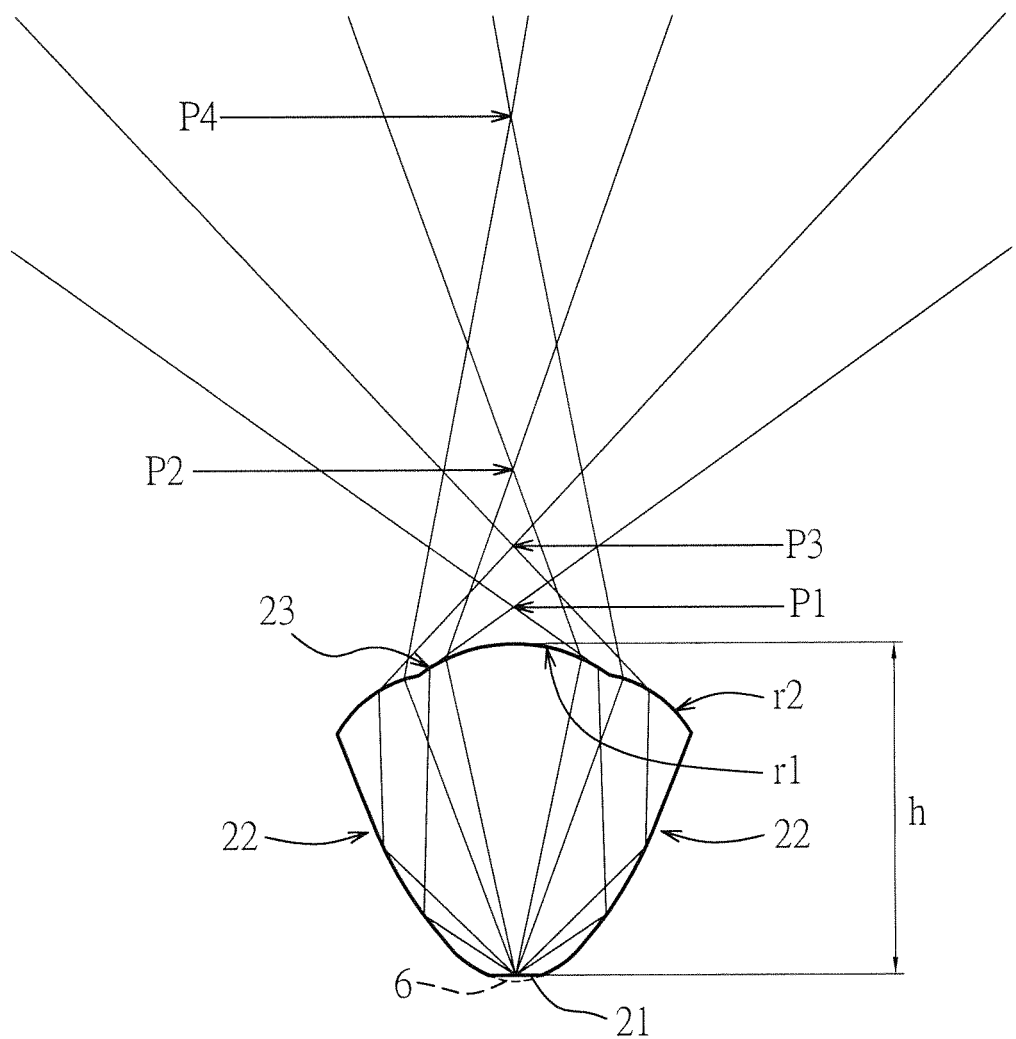
FIG. 7 is a schematic view similar to FIG. 4 and illustrating a cross section of a light guide of the second preferred embodiment.

Referring to FIG. 6 and FIG. 7, a second preferred embodiment of the linear light source 1 to be applied in the optical scanning module 100, according to the present invention, differs from the first preferred embodiment in the configurations that the light converging convex surface 23 of the light guide 2 is a convex surface with multiple radii of curvature. That is to say, there are at least two radii of curvature so that light beams may be directed to evenly illuminate a region defined by focal points and image points of the light converging convex surface 23. The scan target 7 may be further designed to be located within the region defined by the focal points and the image points. Two arrow lines beside the optical axis A as illustrated in FIG. 6 represent a contour of the light beams passing through the light converging convex surface 23 that has multiple radii of curvature. A plurality of points at which light beams converge are located within the contour of the light beams which may be regarded as a focused beam of light. Illuminance along an axis Z perpendicular to the transparent plate 5 and along a direction transverse to the axis Z especially in a region defined by the contour of the light beams and confined by broken lines (see FIG. 6) is relatively stable and has little changes.

Referring to FIG. 7, a central region of the light converging convex surface 23 has a first radius of curvature r1, and a peripheral region of the light converging convex surface 23 adjacent to the first and second reflecting surfaces 22 has a second radius of curvature r2 different from the first radius of curvature r1. In the present invention, preferably, the first radius of curvature r1 ranges from 0.4 h to 0.6 h, and the second radius of curvature r2 ranges from 0.7 h to 1.0 h, in which h is a height of the light guide 2. It is noted that when a relationship between the first radius of curvature r1 and the height h of the light guide 2, and a relationship between the second radius of curvature r2 and the height h of the light guide 2 are maintained to be within the aforementioned ranges, an effect that the scan target 7 may be more evenly illuminated is achieved. A measured result of an experiment described hereinafter proves that when the scan target 7 deviates from the transparent plate 5 within a 1 mm range, a variation of illuminance is lower than 25 lux (lumens per square meter).

In this embodiment, the light beams directed from the focal point of the parabolic transverse section of the imaginary parabolic surface 6 may include a portion to be reflected by the first and second reflecting surfaces 22 so as to form, parallel light beams. A first portion of the parallel light beams is refracted by the central region of the light converging convex surface 23 having the first radius of curvature r1, and is focused at a position $P_1$. The position $P_1$ is a focal point of the central region of the light converging convex surface 23. A distance between the focal point (i.e., $P_1$) of the central region of the light converging convex surface 23 and the light converging convex surface 23 is $$\frac{nr_1}{\Delta n}.$$

The light beams directed from the focal point of the parabolic transverse section of the imaginary parabolic surface 6 may further include first direct light beams. The first direct light beams are refracted directly by the central region of the light converging convex surface 23 having the first radius of curvature r1, and are focused at a position $P_2$. The position $P_2$ is an image point of the central region of the light converging convex surface 23. A distance between the image point (i.e., $P_2$) of the central region of the light converging convex surface 23 and the light converging convex surface 23 is $$\frac{nhr_1}{h\Delta n - n'r_1}.$$

On the other hand, a second portion of the parallel light beams is refracted by the peripheral region of the light converging convex surface 23 having the second radius of curvature r2, and is focused at a position $P_3$. The position $P_3$ is a focal point of the peripheral region of the light converging convex surface 23. A distance between the focal point (i.e., $P_3$) of the peripheral region of the light converging convex surface 23 and the light converging convex surface 23 is $$\frac{nr_2}{\Delta n}.$$

Moreover, the light beams directed from the focal point of the parabolic transverse section of the imaginary parabolic surface 6 may further include second direct light beams. The second direct light beams are refracted directly by the peripheral region of the light converging convex surface 23 having the second radius of curvature r2, and are focused at a position $P_4$. The position $P_4$ is an image point of the peripheral region of the light converging convex surface 23. A distance between the image point (i.e., $P_4$) of the peripheral region of the light converging convex surface 23 and the light converging convex surface 23 is $$\frac{nhr_2}{h\Delta n - n'r_2}.$$

By means of the aforementioned design, the light beams emitted from the linear light source 1 of the second preferred embodiment may be evenly focused at the image points ($P_2$ and $P_4$) and the focal points ($P_1$ and $P_3$) above the light converging convex surface 23, so as to form at most four bright points at which light beams converge. It is noted that since FIG. 7 only illustrates a cross section of the light guide 2, the light beams are represented to converge at said four bright points. However, in practice, since the light guide 2 is rod-shaped, the light beams are in fact converged to form at most four bright lines. The linear light source 1 is thus different from a conventional light source that converges light beams at a brightest line. Therefore, in practice, the disposition of the linear light source 1 is adjusted such that a top surface of the transparent plate 5 is located within or above a region defined by the image points and the focal points, and a clearance which inevitably exists between the transparent plate 5 and the scan target 7 may be further considered in advance, so as to position the scan target 7 within the region defined by the image points and the focal points. Preferably, the scan target 7 is positioned at a center point of the region defined by the image points and the focal points of the central region and the peripheral region of the light converging convex surface 23.

Figure 8:
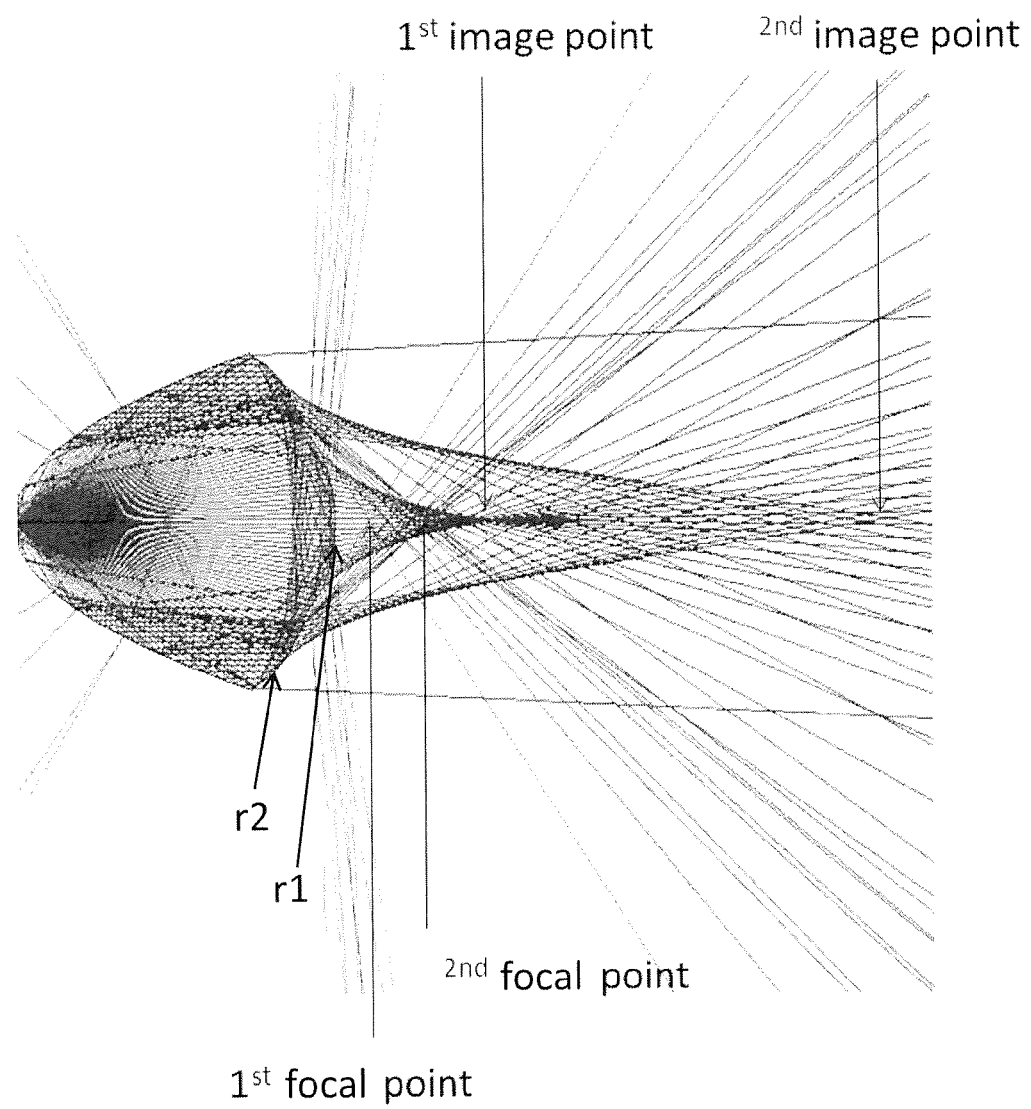
FIG. 8 is a computer simulation diagram illustrating an illumination effect of the second preferred embodiment.

For the purpose of clear explanation that the region defined by the focal points and the image points is capable of providing good illumination effect, a computer simulation diagram is illustrated in FIG. 8. The computer simulation diagram is merely an example of the second preferred embodiment, and is obtained according to one chosen parameter condition. In practice, the light guide 2 is not limited to the computer simulation diagram provided herein, and any light guide that has a parameter condition of r1≠r2 belongs to a scope of the present invention. It is noticeable from FIG. 8 that light beams converge at the $1^{st}$ focal point, the $1^{st}$ image point, the $2^{nd}$ focal point and the $2^{nd}$ image point. These focal points and image points cooperate to define a region, and the scan target is disposed within this region so as to achieve a good illumination effect. In this way, even if paper to be scanned has wrinkles or is thicker, or even if the optical scanning module has an issue of assembly tolerance, the illumination effect may not be adversely influenced so as to maintain scanning quality.

Specifically, in this design, peripheral region of the light converging convex surface 23 ha the second radius of curvature r2, and is focused at the $2^{nd}$ focal point. In the computer simulation diagram, the $2^{nd}$ focal point is located between the $1^{st}$ focal point and the $1^{st}$ image point such that a region defined between the focal point and the $1^{st}$ image point is sufficiently and more evenly illuminated. Therefore, the scan target 7 may be subjected to a favorable illumination effect. Further, the light beams directed from the focal point of the parabolic transverse section of the imaginary parabolic surface 6 may include second direct light beams. The second direct light beams are refracted directly by the peripheral region of the light converging convex surface 23 having the second radius of curvature r2, and are focused at the $2^{nd}$ image point. In the computer simulation diagram, the $2^{nd}$ image point is located beyond the $1^{st}$ image point with respect to the light guide 2. Therefore, as long as the scan target 7 is disposed between the image points and the focal points (i.e., within the range defined by the points at which light beams converge in the computer simulation diagram), the issue of insufficient or attenuated illumination may be alleviated. The design of multiple radii of curvature in the present invention increases the number of bright points, at which light beams converge, along the optical axis A and also along the axis Z perpendicular to the transparent plate 5 since the axis Z merely intersects the optical axis A by an angle (see FIG. 6), so as to promote the effect of even illumination in the region defined by these points.

In this way, a region above and below the scan target 7 may be evenly and concentratedly illuminated so as to promote scanning quality.

Figure 9:
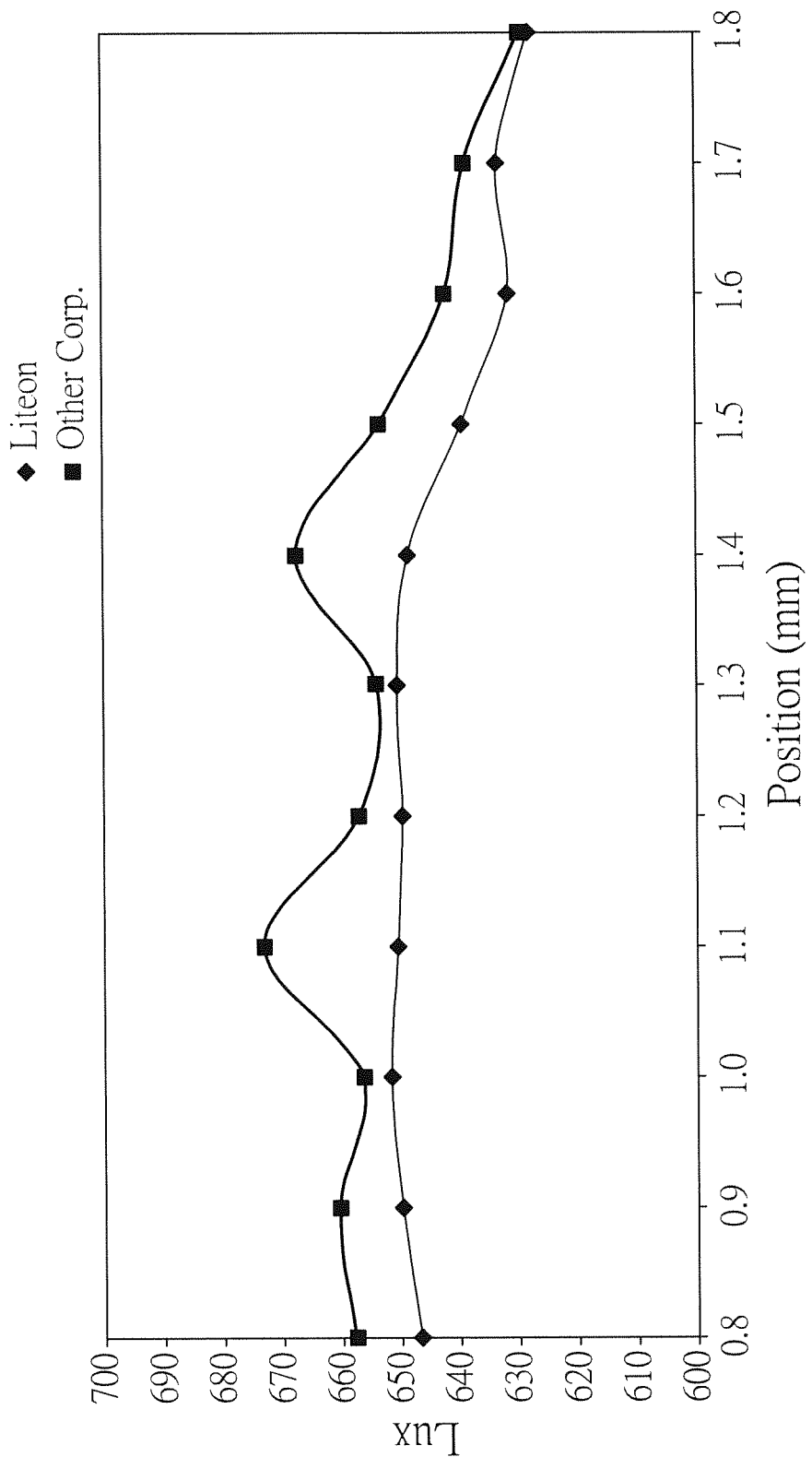
FIG. 9 is a plot to compare a relationship between illuminance and a position of a scan target when alight guide of the present invention and a conventional light guide are adopted.

Referring to FIG. 9, measured data are provided hereinafter to explain that, by virtue of the design of multiple radii of curvature in the second preferred embodiment, the effect of even illumination may be actually achieved in the region above and below the scan target. Specifically, in this embodiment, the height h of the light guide 2 is 2.8 mm, the first radius of curvature r1 is 1.5 mm (i.e. 0.54 h), and the second radius of curvature r2 is 2.4 mm (i.e., 0.86 h). FIG. 9 is drawn based on the following table. The first row of the table depicts a clearance $\Delta Z$ (see FIG. 6) between the top surface of the transparent plate 5 and a lower surface of the scan target 7 (i.e., a surface of paper to be scanned). The clearance $\Delta Z$ represents a condition that the paper is spaced apart from the transparent plate 5 by a distance ranging from 0.1 mm to 1.1 mm. The second row of the table depicts that when the light guide 2 of the present invention is utilized, illuminance (unit: Lux) at different sizes of the clearance $\Delta Z$ is measured. The third row of the table depicts that when a conventional light guide is utilized (in the prior art, a light guide with a hexagonal cross section and without the design of multiple radii of curvature and a parabolic surface), illuminance at different sizes of the clearance $\Delta Z$ is measured. It is noticeable from the table that, in the present invention, a variation between the highest value and the lowest value of illuminance is 24.11 Lux within the variation range of the clearance ΔZ. In the prior art, the variation between the highest value and the lowest value of the measured illuminance is 43.57 Lux within the variation range of the clearance ΔZ, and is much greater than the variation of illuminance measured in the present invention. Moreover, the measured illuminance has a highest value of 673 Lux when the clearance ΔZ is equal to 0.4 mm, and is significantly decreased to 656-657 Lux when the clearance ΔZ slightly deviates to 0.3 mm or 0.5 mm. When the conventional light guide is adopted, since the illuminance along the optical axis is not evenly distributed, a high brightness LED unit is usually required to improve the scanning quality. The present invention is able to maintain an even and good illumination effect without adopting the high brightness LED unit.

|  | Δz (mm) | | | | | | | | | | |
| --- | --- | --- | --- | --- | --- | --- | --- | --- | --- | --- | --- |
|  | 0.1 | 0.2 | 0.3 | 0.4 | 0.5 | 0.6 | 0.7 | 0.8 | 0.9 | 1.0 | 1.1 |
| Present Invention | 646.83 | 649.97 | 651.96 | 650.7 | 649.8 | 650.74 | 648.83 | 639.7 | 631.69 | 633.3 | 627.85 |
| Prior Art | 658.02 | 660.531 | 656.612 | 673.03 | 657.047 | 654.068 | 667.48 | 653.488 | 642.36 | 638.837 | 629.461 |

It is evident from the foregoing that regardless of whether the paper is disposed at the 0.1 mm position or the 1.1 mm position along the axis Z, the variation of illuminance is relatively small using the present invention, that is to say, the linear light source 1 is actually able to provide an even illumination effect in the region above and below the scan target 7. In this way, even though the paper has wrinkles or is not flat, the scan target 7 may be illuminated and scanned properly. Compared with the prior art, when paper has wrinkles or uneven surfaces, a scanning result of the prior art is adversely influenced.

In summary, the linear light source 1 of the present invention is to be applied in the optical scanning module 100 and makes use of a characteristic that the light beams directed from the focal point of the parabolic transverse section of the imaginary parabolic surface 6 are reflected so as to form the parallel light beams and the direct light beams, in cooperation with the light converging convex surface 23 for converging light so as to effectively concentrate light beams within a specific region. In this way, an effect of even illumination may be achieved and the scanning quality may be also promoted.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A linear light source configured to emit light beams for illuminating a surface of a target, said linear light source comprising:
   a light guide having:
      a bottom surface,
      first and second reflecting surfaces extending from opposite side edges of said bottom surface, respectively, and
      a light converging convex surface extending between said first and second reflecting surfaces and curved outward with respect to said bottom surface, said first and second reflecting surfaces defining symmetrical segments of an imaginary parabolic curved surface having a parabolic transverse section opening toward said light converging convex surface;
   a light-emitting unit for emitting light beams to propagate along said light guide and exit through said light converging convex surface; and
   a reflecting layer disposed on said first and second reflecting surfaces;
   wherein said light converging convex surface is a convex surface with multiple radii of curvature, a portion of the light beams being reflected by said first and second reflecting surfaces so as to form parallel light beams, another portion of the light beams forming direct light beams, said light converging convex surface directing said parallel light beams and said direct light beams to converge respectively at multiple points disposed along an optical axis of said light guide directed toward the surface of the target, such that portions of the target disposed within a range defined by the multiple points are evenly illuminated by the light beams directed by said light converging convex surface.

2. The linear light source as claimed in claim 1, wherein the parabolic transverse section has a focal point located at said bottom surface.

3. The linear light source as claimed in claim 1, wherein said bottom surface is provided with a plurality of optical structures; and
   wherein each of said optical structures is selected from a V-cut and a V-projection, adjacent ones of said optical structures being spaced apart by a distance (p), each of said optical structures having one of a depth and a height ranging from 0.05p to 0.6p.

4. The linear light source as claimed in claim 1, wherein the target is evenly illuminated both along an axis perpendicular to the surface of the target and along a direction transverse to the axis.

5. The linear light source as claimed in claim 1, wherein a central region of said light converging convex surface has a first radius of curvature, and a peripheral region of said light converging convex surface adjacent to said first and second reflecting surfaces has a second radius of curvature different from the first radius of curvature, the first radius of curvature ranging from 0.4 h to 0.6 h, and the second radius of curvature ranging from 0.7 h to 1.0 h, in which h represents a height of said light guide.

6. The linear light source as claimed in claim 5,
   wherein a first portion of said parallel light beams is refracted by the central region of said light converging convex surface having the first radius of curvature to converge at a focal point of the central region of said light converging convex surface;
   wherein a first portion of said direct light beams is refracted directly by the central region of said light converging convex surface having the first radius of curvature to converge at an image point of the central region of said light converging convex surface;

wherein a second portion of said parallel light beams is refracted by the peripheral region of said light converging convex surface having the second radius of curvature to converge at a focal point of the peripheral region of said light converging convex surface;

wherein a second portion of said direct light beams is refracted directly by the peripheral region of said light converging convex surface having the second radius of curvature to converge at an image point of the peripheral region of said light converging convex surface; and wherein the target is to be disposed in a region defined by the image points and the focal points of the central region and the peripheral region of said light converging convex surface.

7. The linear light source as claimed in claim 6, wherein the target is to be disposed at a center point of the region defined by the image points and the focal points of the central region and the peripheral region of said light converging convex surface.

8. A light guide for a linear light source configured to emit light beams for illuminating a surface of a target, said light guide comprising:
a light guide body having:
a bottom surface,
first and second reflecting surfaces extending from opposite side edges of said bottom surface, respectively, and
a light converging convex surface extending between said first and second reflecting surfaces and curved outward with respect to said bottom surface,
said first and second reflecting surfaces defining symmetrical segments of an imaginary parabolic curved surface having a parabolic transverse section opening toward said light converging convex surface;
wherein said light converging convex surface is a convex surface with multiple radii of curvature, a portion of light beams passing through said light guide body being reflected by said first and second reflecting surfaces so as to form parallel light beams, another portion of the light beams passing through said light guide body forming direct light beams, said light converging convex surface directing the parallel light beams and the direct light beams to converge respectively at multiple points disposed along an optical axis of said light guide directed toward the surface of the target, such that portions of the target disposed within a range defined by the multiple points are evenly illuminated by the light beams directed by said light converging convex surface.

9. The light guide as claimed in claim 8, wherein the parabolic transverse section has a focal point located at said bottom surface.

10. The light guide as claimed in claim 8, wherein said bottom surface is provided with a plurality of optical structures; and
wherein each of said optical structures is selected from a V-cut and a V-projection, adjacent ones of said optical structures being spaced apart by a distance (p), each of said optical structures having one of a depth and a height ranging from 0.05p to 0.6p.

11. The light guide as claimed in claim 8, wherein the target is evenly illuminated both along an axis perpendicular to the surface of the target and along a direction transverse to the axis.

12. The light guide as claimed in claim 8, wherein a central region of said light converging convex surface has a first radius of curvature, and a peripheral region of said light converging convex surface adjacent to said first and second reflecting surfaces has a second radius of curvature different from the first radius of curvature, the first radius of curvature ranging from 0.4 h to 0.6 h, and the second radius of curvature ranging from 0.7 h to 1.0 h, in which h represents a height of said light guide.

13. The light guide as claimed in claim 12,
wherein a first portion of said parallel light beams is refracted by the central region of said light converging convex surface having the first radius of curvature to converge at a focal point of the central region of said light converging convex surface;
wherein a first portion of said direct light beams is refracted directly by the central region of said light converging convex surface having the first radius of curvature to converge at an image point of the central region of said light converging convex surface;
wherein a second portion of said parallel light beams is refracted by the peripheral region of said light converging convex surface having the second radius of curvature to converge at a focal point of the peripheral region of said light converging convex surface;
wherein a second portion of said direct light beams is refracted directly by the peripheral region of said light converging convex surface having the second radius of curvature to converge at an image point of the peripheral region of said light converging convex surface; and
wherein the target is to be disposed in a region defined by the image points and the focal points of the central region and the peripheral region of said light converging convex surface.

14. The light guide as claimed in claim 13, wherein the target is to be disposed at a center point of the region defined by the image points and the focal points of the central region and the peripheral region of said light converging convex surface.

15. An optical scanning module comprising a linear light source configured to emit light beams for illuminating a surface of a scan target, wherein said linear light source includes:
a light guide having:
a bottom surface,
first and second reflecting surfaces extending from opposite side edges of said bottom surface, respectively, and
a light converging convex surface extending between said first and second reflecting surfaces and curved outward with respect to said bottom surface,
said first and second reflecting surfaces defining symmetrical segments of an imaginary parabolic curved surface having a parabolic transverse section opening toward said light converging convex surface;
a light-emitting unit for emitting light beams to propagate along said light guide and exit through said light converging convex surface; and
a reflecting layer disposed on said first and second reflecting surfaces;
wherein a portion of the light beams is reflected by said first and second reflecting surfaces so as to form parallel light beams, another portion of the light beams forming direct light beams, said light converging convex surface directing said parallel light beams and said direct light beams to converge respectively at multiple points disposed along an optical axis of said light guide directed toward the surface of the scan target, such that portions of the scan target disposed within a range defined by the multiple points are evenly illuminated by the light beams directed by said light converging convex surface; and wherein the scan target has an uneven surface.

16. The optical scanning module as claimed in claim 15, further comprising a transparent plate for placement of the scan target, said light guide being disposed below said transparent plate, wherein the scan target is evenly illuminated along an axis perpendicular to said transparent plate and along a direction transverse to the axis.

17. The optical scanning module as claimed in claim 15, wherein said light converging convex surface of said light guide is a convex surface with multiple radii of curvature.

18. The linear light source as claimed in claim 17, wherein a central region of said light converging convex surface has a first radius of curvature, and a peripheral region of said light converging convex surface adjacent to said first and second reflecting surfaces has a second radius of curvature different from the first radius of curvature, the first radius of curvature ranging from 0.4 h to 0.6 h, and the second radius of curvature ranging from 0.7 h to 1.0 h, in which h represents a height of said light guide.

19. The linear light source as claimed in claim 18, wherein a first portion of said parallel light beams is refracted by the central region of said light converging convex surface having the first radius of curvature to converge at a focal point of the central region of said light converging convex surface;

wherein a first portion of said direct light beams is refracted directly by the central region of said light converging convex surface having the first radius of curvature to converge at an image point of the central region of said light converging convex surface;

wherein a second portion of said parallel light beams is refracted by the peripheral region of said light converging convex surface having the second radius of curvature to converge at a focal point of the peripheral region of said light converging convex surface;

wherein a second portion of said direct light beams is refracted directly by the peripheral region of said light converging convex surface having the second radius of curvature to converge at an image point of the peripheral region of said light converging convex surface; and wherein the target is to be disposed in a region defined by the image points and the focal points of the central region and the peripheral region of said light converging convex surface.

20. The linear light source as claimed in claim 19, wherein the scan target is to be disposed at a center point of the region defined by the image points and the focal points of the central region and the peripheral region of said light converging convex surface.

* * * * *